United States Patent
Fiorani et al.

(10) Patent No.: US 12,262,430 B2
(45) Date of Patent: Mar. 25, 2025

(54) NODES AND METHOD FOR HANDLING MESSAGE DELIVERY TO A UE

(71) Applicant: Telefonaktiebolaget LM Ericsson (publ), Stockholm (SE)

(72) Inventors: Matteo Fiorani, Solna (SE); Alexander Vesely, Feldbach (AT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 308 days.

(21) Appl. No.: 17/283,734

(22) PCT Filed: Oct. 3, 2019

(86) PCT No.: PCT/SE2019/050960
§ 371 (c)(1),
(2) Date: Apr. 8, 2021

(87) PCT Pub. No.: WO2020/076218
PCT Pub. Date: Apr. 16, 2020

(65) Prior Publication Data
US 2021/0329509 A1 Oct. 21, 2021

Related U.S. Application Data (60) Provisional application No. 62/743,667, filed on Oct. 10, 2018.

(51) Int. Cl.
*H04W 76/15* (2018.01)
*H04L 51/58* (2022.01)
*H04W 92/20* (2009.01)

(52) U.S. Cl.
CPC ............. *H04W 76/15* (2018.02); *H04L 51/58* (2022.05); *H04W 92/20* (2013.01)

(58) Field of Classification Search
CPC . H04W 36/0069; H04W 76/15; H04W 92/20; H04W 80/02; H04L 51/58; H04L 51/23; H04L 69/321
See application file for complete search history.

(56) References Cited

U.S. PATENT DOCUMENTS

| | | | |
|---|---|---|---|
| 2004/0203623 A1* | 10/2004 | Wu | H04L 1/188 455/67.11 |
| 2019/0342148 A1* | 11/2019 | Hong | H04W 28/0252 |
| 2021/0298116 A1* | 9/2021 | Toeda | H04W 80/02 |

FOREIGN PATENT DOCUMENTS

WO 2019194726 A1 10/2019

OTHER PUBLICATIONS

R3-173743, Qualcomm Incorporated, "Feedback of DL RRC Delivery over MCG Split SRB (P-CR 38.423)", 3GPP TSG-RAN WG3 #97bis, Oct. 2017 (Year: 2017).*

(Continued)

*Primary Examiner* — Gary Mui
*Assistant Examiner* — Yewon Kim
(74) *Attorney, Agent, or Firm* — Weisberg I.P. Law, P.A.

(57) ABSTRACT

The embodiments herein relate to a method performed by a first node for handling message delivery to a UE. The first node sends an indication to a second node. The indication indicates that the second node should inform the first node when one or more messages have been successfully delivered by the second node to the UE. The first node receives, from the second node, a confirmation of that the one or more messages have been successfully delivered by the second node to the UE.

13 Claims, 7 Drawing Sheets

(56) References Cited

OTHER PUBLICATIONS

R3-185896, Ericsson, "RRC Delivery Indication", 3GPP TSG-RAN WG3 NR #101bis, Oct. 2018 (Year: 2018).*
R3-185532 Qualcomm Incorporated, "RRC Delivery Reporting over F1", 3GPP TSG-RAN WG3 Meeting #101bis, Oct. 2018 (Year: 2018).*
3GPP TSG-RAN WG3 Meeting #101bis R3-186121; RRC Delivery Indication; Ericsson et al.; Oct. 8-12, 2018, Chengdu, China (Year: 2018).*
3GPP TSG-RAN WG3 Meeting #101 R3-185636; DL RRC Message Transfer Delivery Status; Nokia et al.; Oct. 8-12, 2018, Chengdu, China (Year: 2018).*
3GPP TSG-RAN WG3 Meeting #101bis R3-185532; RRC Delivery Reporting over F1; Qualcomm Incorporated; Oct. 8-12, 2018, Chengdu, China (Year: 2018).*
International Search Report and Written opinion dated Jan. 8, 2020 for International Application No. PCT/SE2019/050960 filed Oct. 3, 2019, consisting of 14-pages.
3GPP TSG-RAN WG3 Meeting #101bis R3-185532; Title: RRC Delivery Reporting over F1; Agenda Item: 31.3.1.27; Source: Qualcomm Incorporated; Document for: Discussion; Date and Location: Oct. 8-12, 2018, Chengdu, China, consisting of 2-pages.
3GPP TSG-RAN WG3 Meeting #101bis R3-185635; Title: Discussion on DL RRC Message Transfer Delivery Status; Agenda Item: 31.3.1.27; Source: Nokia, Nokia Shanghai Bell; Document for: Discussion and Decision; Date and Location: Oct. 8-12, 2018, Chengdu, China, consisting of 2-pages.
3GPP TSG-RAN WG3 Meeting #101 Tdoc R3-185021; Title: NAS Non-delivery in higher layer split deployments; Agenda Item: 31.3.4.8; Source: Ericsson; Document for: Discussion; Date and Location: Aug. 20-24, Gothenburg, Sweden, consisting of 2-pages.
3GPP TSG-RAN WG3 NR #101bis Tdoc R3-185896; Title: RRC Delivery Indication; Agenda Item: 31.3.1.27; Source: Ericsson; Document for: Discussion; Date and Location: Oct. 8-12, 2018, Chengdu, China, consisting of 4-pages.
3GPP TS 38.473 V15.3.0; 3rd Generation Partnership Project; Technical Specification Group Radio Access Network NG-RAN; F1 application protocol (F1AP) (Release 15), Sep. 2018, consisting of 176-pages.
3GPP TS 38.413 V15.1.0; 3rd Generation Partnership Project; Technical Specification Group Radio Access Network NG-RAN; NG Application Protocol (NGAP) (Release 15), Sep. 2018, consisting of 295-pages.
3GPP TS 38.401 V15.3.0; 3rd Generation Partnership Project; Technical Specification Group Radio Access Network NG-RAN; Architecture description (Release 15), Sep. 2018, consisting of 39-pages.
3GPP TS 38.322 V15.3.0; 3rd Generation Partnership Project; Technical Specification Group Radio Access Network NR; Radio Link Control (RLC) protocol specification (Release 15), Sep. 2018, consisting of 33-pages.
3GPP TS 23.501 V15.3.0; 3rd Generation Partnership Project; Technical Specification Group Services and System Aspects; System Architecture for the 5G System; Stage 2 (Release 15), Sep. 2018, consisting of 226-pages.
3GPP TS 38.413 V0.7.0; 3rd Generation Partnership Project; Technical Specification Group Radio Access Network NG-RAN; NG Application Protocol (NGAP) (Release 15), Mar. 2018, consisting of 121-pages.
3GPP TS 38.300 V15.3.0; 3rd Generation Partnership Project; Technical Specification Group Radio Access Network NR; NR and NG-RAN Overall Description; Stage 2 (Release 15), Sep. 2018, consisting of 92-pages.

* cited by examiner

NODES AND METHOD FOR HANDLING MESSAGE DELIVERY TO A UE

CROSS-REFERENCE TO RELATED APPLICATIONS

This application is a Submission Under 35 U.S.C. § 371 for U.S. National Stage Patent Application of International Application No.: PCT/SE2019/050960, filed Oct. 3, 2019 entitled "NODES AND METHOD FOR HANDLING MESSAGE DELIVERY TO A UE," which claims priority to U.S. Provisional Application No.: 62/743667, filed Oct. 10, 2018, the entireties of both of which are incorporated herein by reference.

TECHNICAL FIELD

Embodiments herein relate generally to a first node, a method performed by the first node, a second node and a method performed by the second node. More particularly the embodiments herein relate to handling message delivery to a User Equipment (UE).

BACKGROUND

3GPP TS 23.501 V15.3.0 (2018-09) describes the Fifth Generation (5G) system as follows:

"The 5G System architecture is defined to support data connectivity and services enabling deployments to use techniques such as e.g. Network Function Virtualization and Software Defined Networking. The 5G System architecture shall leverage service-based interactions between Control Plane (CP) Network Functions where identified. Some key principles and concept are to:

- Separate the User Plane (UP) functions from the Control Plane (CP) functions, allowing independent scalability, evolution and flexible deployments e.g. centralized location or distributed (remote) location.
- Modularize the function design, e.g. to enable flexible and efficient network slicing.
- Wherever applicable, define procedures (i.e. the set of interactions between network functions) as services, so that their re-use is possible.
- Enable each Network Function to interact with other NF directly if required. The architecture does not preclude the use of an intermediate function to help route Control Plane messages (e.g. like a DRA).
- Minimize dependencies between the Access Network (AN) and the Core Network (CN). The architecture is defined with a converged core network with a common AN-CN interface which integrates different Access Types e.g. 3GPP access and non-3GPP access.
- Support a unified authentication framework.
- Support "stateless" NFs, where the "compute" resource is decoupled from the "storage" resource.
- Support capability exposure.
- Support concurrent access to local and centralized services. To support low latency services and access to local data networks, UP functions can be deployed close to the Access Network."

RAN Architecture

Figure 1:
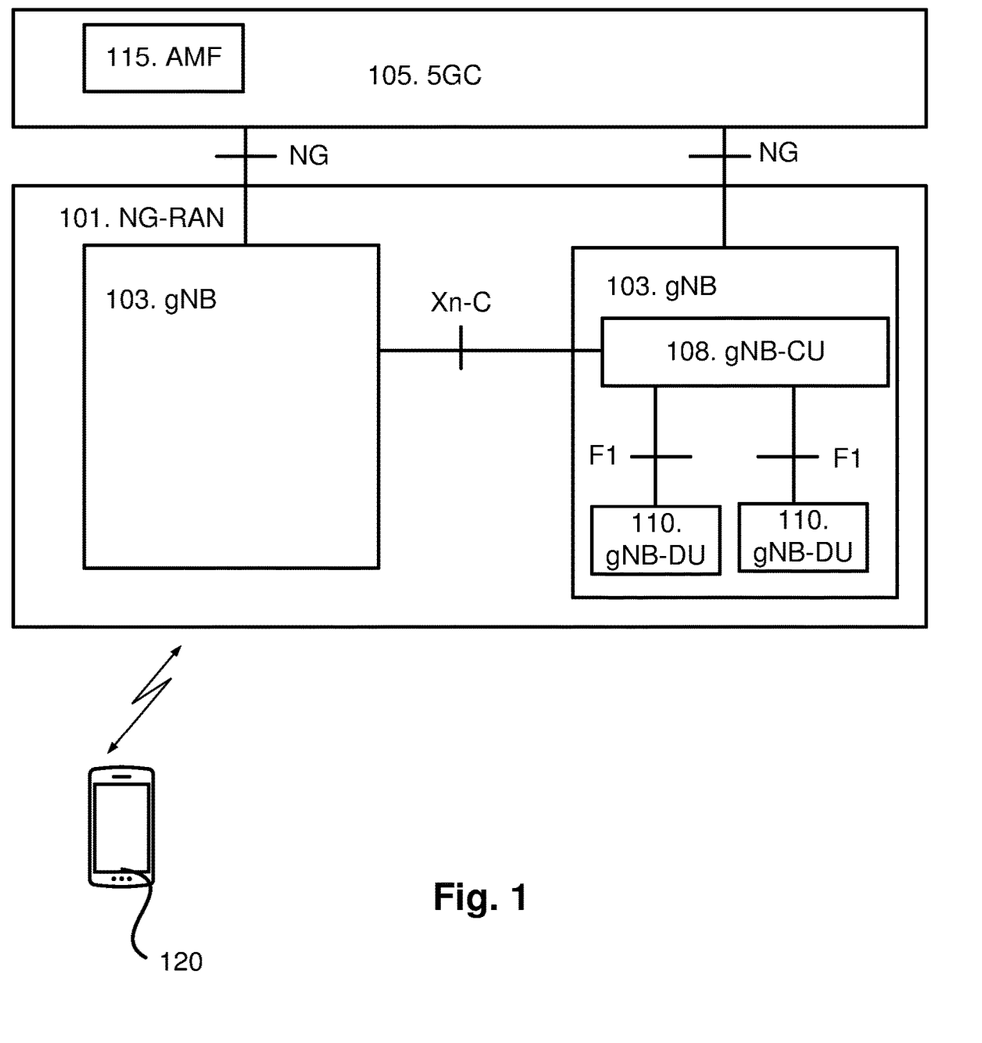
FIG. 1 is a schematic block diagram illustrating an example of a NG RAN architecture.

The current Next Generation (NG) Radio Access Network (RAN) architecture is described in 3GPP TS 38.401 V15.3.0 (2018-09) and is illustrated in FIG. 1. The NG RAN architecture may be further described as follows:

The NG-RAN 101 comprises of a set of gNodeBs (gNB) 103 connected to the Fifth Generation Core network (5GC) 105 through the NG interface.

A gNB 103 may support Frequency Division Duplex (FDD) mode, Time Division Duplex (TDD) mode or dual mode operation.

gNBs 103 may be interconnected through the Xn interface.

A gNB 103 may comprise a gNB-Central Unit (gNB-CU) 108 and gNB-Distributed Units (gNB-DU) 110.

A gNB-CU 108 and a gNB-DU 110 are connected via a F1 logical interface.

One gNB-DU 110 is connected to only one gNB-CU 108.

The NG RAN is defined as follows in 3GPP TS 23.501 V15.3.0 (2018-09):

"A radio access network that supports one or more of the following options with the common characteristics that it connects to 5GC:

1) Standalone New Radio.
2) New Radio is the anchor with E-UTRA extensions.
3) Standalone E-UTRA.
4) E-UTRA is the anchor with New Radio extensions."

The 5GC 105 which connects to the NG RAN 101 comprises one or multiple Access Management Function(s) (AMF) 115. AMF is a node in the core network with specific functionalities. The main responsibility of AMF is to manage mobility of the UEs 120 between different Radio Access Network/Node (RAN) cells. A UE 120 always camps on a specific AMF 115 and is directed by the NG-RAN node 101 towards that specific AMF 115.

One or multiple UEs 120 is served by the NG-RAN 101. NG, Xn and F1 shown in FIG. 1 are logical interfaces. For NG-RAN 101, the NG and Xn-C interfaces fora gNB 103 comprising a gNB-CU 108 and gNB-DUs 110, terminate in the gNB-CU 108. For gNB-DC, the S1-U and X2-C interfaces for a gNB 103 comprising a gNB-CU 108 and gNB-DUs 110, terminate in the gNB-CU 108. The gNB-CU 108 and connected gNB-DUs 110 are only visible to other gNBs 103 and the 5GC 105 as a gNB 103.

The NG-RAN 101 is layered into a Radio Network Layer (RNL) and a Transport Network Layer (TNL). The NG-RAN architecture, i.e. the NG-RAN logical nodes and interfaces between them, is defined as part of the RNL. For each NG-RAN interface, e.g. NG, Xn, F1, the related TNL protocol and the functionality are specified. The TNL provides services for user plane transport and signalling transport. In a NG-Flex configuration, each gNB 103 is connected to all AMFs 115 within an AMF Region. The AMF Region is defined in 3GPP TS 23.501 V15.3.0 (2018-09) as follows "An AMF Region consists of one or multiple AMF Sets". AN AMF region is identified with an AMF region ID. The 3GPP TS 23.501 V15.3.0 (2018-09) defines the AMF set as "An AMF Set consists of some AMFs that serve a given area and Network Slice(s). AMF Set is unique within an AMF Region and it comprises of AMFs that support the same Network Slice(s). Multiple AMF Sets may be defined per AMF Region."

The general principles for the specification of the F1 interface are as follows:

- The F1 interface is to be open
- The F1 interface supports the exchange of signalling information between the endpoints, in addition the interface shall support data transmission to the respective endpoints.
- From a logical standpoint, the F1 is a point-to-point interface between the endpoints, a point-to-point logical interface should be feasible even in the absence of a physical direct connection between the endpoints.

The F1 interface supports control plane and user plane separation;

The F1 interface separates RNL and TNL.

The F1 interface enable exchanges of UE associated information and non-UE associated information.

The F1 interface is defined to be future proof to fulfil different new requirements, support new services and new functions.

One gNB-CU 108 and set of gNB-DUs 110 are visible to other logical nodes as a gNB 103. The gNB 103 terminates X2, Xn, NG and S1-U interfaces;

The CU 108 may be separated in Control Plane (CP) and User Plane (UP).

CU-DU Split: Aspects Related to Radio Resource Control (RRC) Handling

Figure 2:
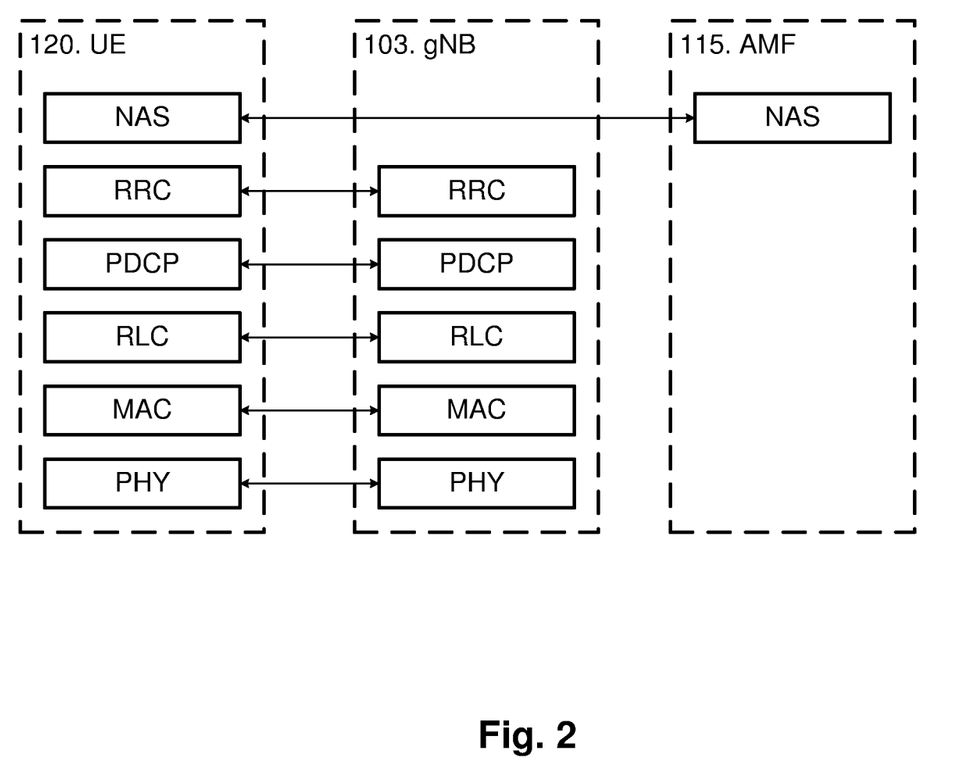
FIG. 2 is a schematic block diagram illustrating an example of a protocol stack.

In the 5G network, a split architecture where the NG-RAN node 103 comprises a central unit (CU) and a distributed unit (DU) is introduced. The protocol stack between the UE 120, gNB 103 and the AMF 115 is shown in FIG. 2. For the purpose of this document, the focus is on nodes where the protocol stack between the gNB 103 and UE 120 is split into the DU and CU interconnected by an interface which in NR/5G is called F1-C and the application protocol is called F1 Application Protocol (F1AP). The F1AP is defined in 3GPP TS 38.473 V15.3.0 (2018-09). F1AP provides the signalling service between gNB-DU and the gNB-CU that is required to fulfil F1AP functions.

The protocol for the UE 120 comprises at least one of the following layers:
Non Access Stratum (NAS)
RRC
Packet Data Convergence Protocol (PDCP)
Radio Link Control (RLC)
Media Access Control (MAC)
Physical (PHY)

The protocol for the gNG 103 comprises at least one of the following layers:
RRC
PDCP
RLC
MAC
PHY The protocol for the AMF 115 comprises the following layer:
NAS The protocol stack is distributed in the CU and DU as:
CU: RRC/PDCP
DU: RLC/MAC/PHY According to 3GPP TS 38.322 V15.3.0 (2018-09) section 4.3.1 one of the services provided by the RLC layer to higher layers is: "AM data transfer, including indication of successful delivery of upper layers PDUs".

However, in a distributed deployment the DU, where the RLC is located, does not send an acknowledgement to the CU, where upper layers are located. Instead, it informs upper layers when there is some failure e.g. a radio link failure. However, there are messages which require special actions when they are received from the AMF 115. One such case is when NAS messages which, according to 3GPP TS 38.413 V15.1.0 (2018-09) shall be treated as:

"The NAS Non Delivery Indication procedure is used when the NG-RAN node decides not to start the delivery of a NAS message that has been received over a UE-associated logical NG-connection or the NG-RAN node is unable to ensure that the message has been received by the UE. The NG-RAN node initiates the procedure by sending a NAS NON DELIVERY INDICATION message to the AMF. The NG-RAN node shall report the non-delivery of a NAS message by including the non-delivered NAS message within the NAS-PDU IE and an appropriate cause value within the Cause IE, e.g., "NG intra system handover triggered", "NG inter system handover triggered" or "Xn handover triggered"."

In order to minimize latency, the messages are processed by the PDCP before they are sent to the DU and over the interconnecting interface F1-C. In the DU, the messages are queued before they are processed by the RLC layer. Already today, the CU indicates to the DU which Signalling Radio Bearer (SRB) and UE each message, e.g. PDCP Protocol Data Unit (PDU), shall be sent on. When the RLC has successfully sent one PDU this is indicated to the DU and the next message, if any, in the queue for that UE 120 and SRB is moved into the RLC entity for transmission.

A problem which occurs is that the gNB 103, or more specifically the CU 108, does not know which messages have been delivered or not, in case there is a radio link failure or handover. An additional problem is the following: In case of split SRBs, the CU 108 is requested to send, over the X2/Xn interface, information about the RRC messages that are successfully transmitted over the radio interface. However, in the split architecture the CU 108 does not know whether this information has been successfully delivered to the UE 120. Therefore, the function over the X2/Xn, as currently specified, cannot support the required function of clearly indicating successful delivery of Downlink (DL) RRC messages to the UE.

In case of Dual Connectivity (DC), a Master Node (MN) and a Secondary Node (SN) are currently not aware of whether an RRC message that is supposed to be transmitted by the peer node has been successfully delivered or not Therefore, there is a need to at least mitigate or solve this issue.

SUMMARY

An objective of embodiments herein is therefore to obviate at least one of the above disadvantages and to provide improved handling of message delivery to a UE.

According to a first aspect, the object is achieved by a method performed by a first node for handling message delivery to a UE. The first node sends an indication to the second node. The indication indicates that the second node should inform the first node when a message to the UE has been successfully delivered by the second node to the UE. The first node receives, from the second node, a confirmation of that the message has been successfully delivered by the second node to the UE.

According to a second aspect, the object is achieved by a method performed by a second node for handling message delivery to a UE. The second node receives an indication from the first node. The indication indicates that the second node should inform the first node when a message to the UE has been successfully delivered by the second node to the UE. The second node determines whether the message has been successfully delivered to the UE. When the message has been successfully delivered, the second node sends, to the first node, a confirmation of that the message has been successfully delivered to the UE.

According to a third aspect, the object is achieved by a first node for handling message delivery to a UE. The first node is configured to send an indication to the second node.

The indication indicates that the second node should inform the first node when a message to the UE has been successfully delivered by the second node to the UE. The first node is configured to receives, from the second node, a confirmation of that the message has been successfully delivered by the second node to the UE.

According to a fourth aspect, the object is achieved by a second node for handling message delivery to a UE. The second node is configured to receive an indication from the first node. The indication indicates that the second node should inform the first node when a message to the UE has been successfully delivered by the second node to the UE. The second node is configured to determine whether the message has been successfully delivered to the UE. The second node is configured to send, when the message has been successfully delivered and to the first node, a confirmation of that the message has been successfully delivered to the UE.

Embodiments herein afford many advantages, of which a non-exhaustive list of examples follows:

An advantage of the embodiments here is that they enable to support the NAS non-delivery indication on NG and provide information about highest delivered PDCP SN over at last one of the interfaces F1/X2/Xn.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail by way of example only in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 3:
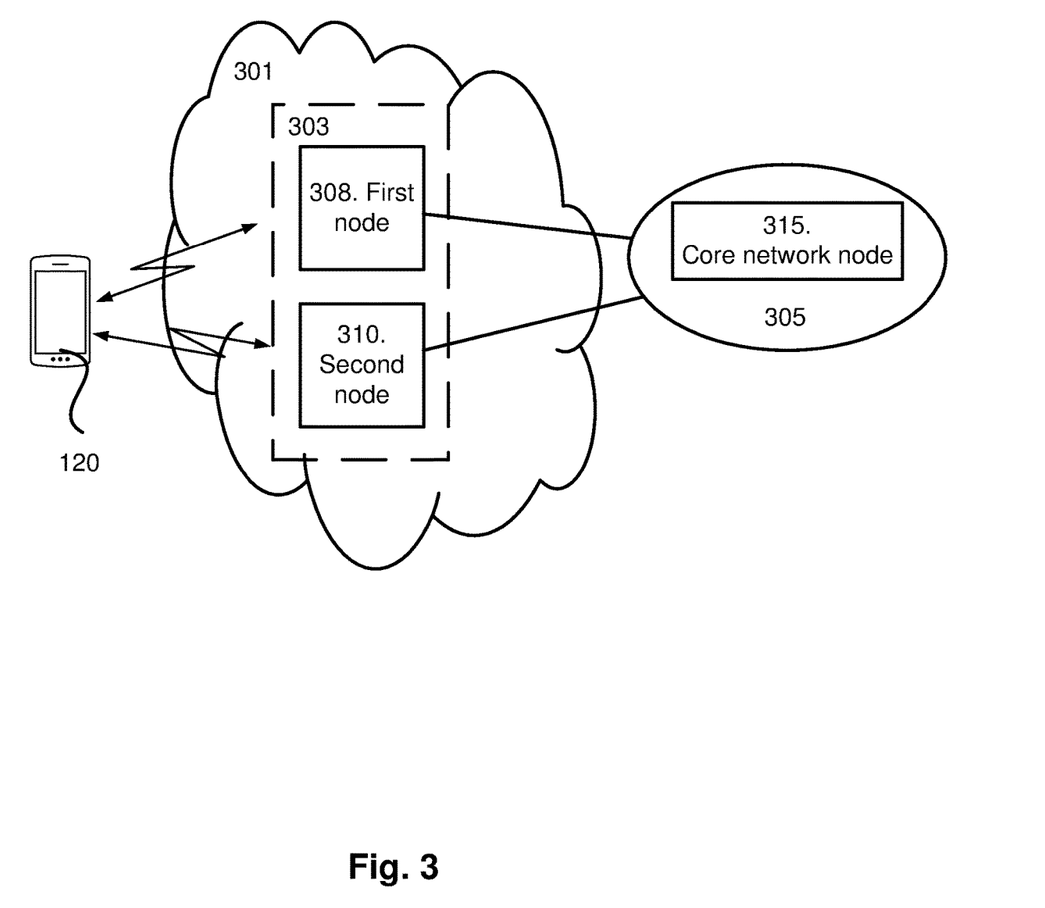
FIG. 3 is a schematic block diagram illustrating of a communication system.

A communication scenario where the examples herein may be employed is illustrated in FIG. 3 involving a first node 308 and a second node 310 which serves the UE 120 by communicating over a radio link between the UE 120 and the first node 308 and the second node 310. The first node 308 and the second node 310 may be separate standalone nodes or they may be co-located in one node, e.g. in an access node 303 as illustrated with a dotted box in FIG. 3. The first node 308 may be referred to as a first unit, a Central Unit (CU), gNB-CU 108, MeNB, a first access node, a first radio access node, a first network node, or a Master Node (MN). The second node 310 may be referred to as second unit, a Distributed Unit (DU), a gNB-DU 110, MeNB, a second access node, a second radio access node, a second network node, or a Secondary Node (SN). The first node 308 and the second node 310 may be comprised in an access network 301. The first node 308 and the second node 310 may be located at the same location or at different locations. For example, the first node 308 may be located in the cloud and the second node may be located, e.g. distributed, in the access network 301.

The access node 303 may be a base station, an evolved Node B (eNB) or a gNB, depending on the terminology used. The access network 301 is connected to a core network 305 comprising one or a plurality of core network node(s) 315. The core network node 315 may be for example an AMF 115. As mentioned earlier, the AMFs 115 are adapted to manage mobility of UEs 120 between different access network nodes or cells. The core network 305 may comprise other core network nodes 315 instead of or in addition to the AMF 115, such as e.g. a SMF, a PCF, UPF etc.

The UE 120 may be a device by which a subscriber may access services offered by an operator's network and services outside operator's network to which the operator's radio access network and core network provide access, e.g. access to the Internet. The UE 120 may be any device, mobile or stationary, enabled to communicate in the communications network, for instance but not limited to e.g. mobile phone, smart phone, sensors, meters, vehicles, household appliances, medical appliances, media players, cameras, Machine to Machine (M2M) device, Device to Device (D2D) device, Internet of Things (IoT) device, terminal device, communication device or any type of consumer electronic, for instance but not limited to television, radio, lighting arrangements, tablet computer, laptop or Personal Computer (PC). The UE 120 may be portable, pocket storable, hand held, computer comprised, or vehicle mounted devices, enabled to communicate voice and/or data, via the radio access network, with another entity, such as another UE or a server.

It should be noted that the communication links in the communications system illustrated in FIG. 3 may be of any suitable kind including either a wired or wireless link. The link may use any suitable protocol depending on type and level of layer, e.g. as indicated by the Open Systems Interconnection (OSI) model, as understood by the person skilled in the art.

As mentioned above, a problem which occurs is that the first node 308 does not know which messages have been delivered or not in case there is a radio link failure or handover. Since the F1AP DL RRC Message Transfer procedure does not have a response message, the DL RRC message handling F1AP protocol function in the first node 308 cannot have a timer supervising the successful execution of this F1AP procedure.

In case of split SRBs, the first node 308 is requested to send, over the X2/Xn interface, information about the RRC messages that are successfully transmitted over the radio interface. However, in the split architecture the CU 108 does not know whether this information has been successfully delivered to the UE 120, as no sufficient indication is provided over the F1 about successful DL RRC message delivery to the UE 120.

One solution to the problems described above may be as follows:

An example where the first node 308 is a CU and the second node 310 is a DU will now be described. Note that the reference numbers 308 will be used when referring to the CU and the reference number 310 will be used when referring to the DU below.

1. The CU 308 includes an indication, e.g., RRC Delivery Request IE, over F1AP DL messages that carry RRC messages for which the requests the DU 310 to acknowledge the successful delivery to the UE 120. IE is short for Information Element.
2. When one or more RRC message has been delivered to the UE 120, i.e., the DU 310 has received an RLC-Acknowledgement from the UE 120, then the DU 310 will send a confirmation, e.g., RRC Delivery Report message, to the CU 308 acknowledging the successful delivery. To allow correct handling at the CU 308, the confirmation, e.g., RRC Delivery Report, should include at least:
   a. An identifier for the RRC message that triggered the report, e.g., a PDCP SN;
   b. A transmitted PDCP SN that has been delivered in sequence to the UE 120.

The transmitted PDCP SN mentioned above may be a highest transmitted PDCP SN.

This approach would allow the CU 308 to both be aware of whether one or more specific RRC messages have been delivered successfully, e.g., so that the CU 308 can decide whether to send the NAS non-delivery indication over the NG Application Protocol (NGAP). This also allows the CU 308 to optimize Radio Resource Management (RRM) decisions. In addition, this allows the CU 308 to be aware of the PDCP SN, e.g. the highest PDCP SN, delivered in sequence to the UE 120, so that the CU 308 can report it to a neighbour node over the Xn/X2 interfaces for split SRBs.

The mechanism described above for the scenario with the CU 308 and DU 310 could also be extended over X2/Xn for handling split SRBs in Dual-Connectivity (DC). In DC, there are two nodes serving the UE 120: MN and SN, i.e. when the first node 308 is a MN and the second node 310 is a SN. Note that the reference numbers 308 will be used when referring to the MN and the reference number 310 will be used when referring to the SN below. The MN 308 hosts the RRC protocol termination toward the UE 120. The MN 308 and SN 310 may need to exchange RRC messages that needs then to be forwarded to the UE 120. This is done using the RRC Transfer procedure. Currently, the RRC Transfer procedure over the X2/Xn only allows to report the delivered PDCP SN 310, e.g. the highest delivered PDCP SN 310. This does not allow the node to know if and when a given RRC message has been delivered to the UE 120, but it only gives information about the current delivery status. For example, in case of out-of-order delivery to the UE 120, a node, e.g. MN 308 or SN 310, may not be able to know if, at a given time, one or more RRC messages have been delivered or not. By applying the mechanism described above to X2/Xn, the nodes, e.g. MN 308 and SN 310, will be always aware of which messages have been acknowledged by the UE 120, and would be informed in case an out-of-order delivery happens. The solution could be extended to X2/Xn as follows:

1) The MN 308 and/or the SN 310 includes an indication, e.g., RRC Delivery Request IE, over X2AP, e.g. XnAP, that carries one or more RRC messages that should be forwarded to the UE 120 by the peer node, and for which the MN 308 and/or the SN 310 requests the peer node to acknowledge the successful delivery to the UE 120.
2) When one or more RRC messages have been delivered to the UE 120, the peer node sends a report to the MN 308 and/or the SN 310 acknowledging the successful delivery. To allow correct handling at the MN 308 and/or the SN 310, the confirmation, e.g., RRC Delivery Report, should include at least:
   a. An identifier for the one or more RRC messages that triggered the report, e.g., a PDCP SN;
   b. A transmitted PDCP SN that has been delivered in sequence to the UE 120, e.g. a highest transmitted PDCP SN.

Alternatively, the CU 308 provides on F1, or the access node that is responsible for transmitting the one or more RRC messages to the UE 120, provides on X2/Xn, a list of PDCP SNs of RRC messages the CU 308 or the access network node failed to send to the UE 120.

Now, the F1 interface will be used as an example, but it is equally applicable to X2 and Xn.

To allow the CU 308 to indicate to the DU 310 that it requests the delivery report for a given one or more RRC messages, an RRC-Delivery-Request IE can be added to the DL messages in F1AP carrying RRC containers. An example of a DL message may be the DL RRC Message Transfer, as indicated in the following Table 1, where the additional IE is shown with underline. In the example of table 1, the CU 308 is exemplified with a gNB-CU and the DU 310 is exemplified with a gNB-DU. Note that the reference numbers 308 will be used when referring to the gNB-CU and the reference number 310 will be used when referring to the gNB-DU below.

DL RRC message exemplified in Table 1 is sent by the gNB-CU 308 to transfer the layer 3 message to the gNB-DU 310 over the F1 interface. The message is sent in the following direction: gNB-CU 308->gNB-DU 310, i.e. it is sent from the gNB-CU 308 and received by the gNG-DU 310. The DL RRC message comprises an IE referred to as RRC Delivery Status Request which indicates whether a RRC DELIVERY REPORT procedure is requested for the RRC message.

TABLE 1

| | | | | | |
|---|---|---|---|---|---|
| | | | DL RRC message transfer | | |
| IE/Group Name | Presence | Range | IE type and reference | Semantics description | Criticality | Assigned Criticality |
| Message Type | M | | 9.3.1.1 | | YES | ignore |
| gNB-CU UE F1AP ID | M | | 9.3.1.4 | | YES | reject |

TABLE 1-continued

DL RRC message transfer

| IE/Group Name | Presence | Range | IE type and reference | Semantics description | Criticality | Assigned Criticality |
|---|---|---|---|---|---|---|
| gNB-DU UE F1AP ID | M | | 9.3.1.5 | | YES | reject |
| old gNB-DU UE F1AP ID | O | | 9.3.1.5 | Include it if RRCConnection Reestablishment is included in RRC-Container | YES | reject |
| SRB ID | M | | 9.3.1.7 | | YES | reject |
| Execute Duplication | O | | ENUMERATED (true, . . . ) | | YES | ignore |
| RRC-Container | M | | 9.3.1.6 | Includes the DL-DCCH-Message IE as defined in subclause 6.2 of TS 38.331 encapsulated in a PDCP PDU, or the DL-CCCH-Message IE as defined in subclause 6.2 of TS 38.331 [8]. | YES | reject |
| RAT-Frequency Priority Information | O | | 9.3.1.34 | | YES | reject |
| RRC Delivery Status Request | O | | ENUMERATED (true, . . . ) | Indicates whether RRC DELIVERY REPORT procedure is requested for the RRC message. | YES | ignore |

Over the X2 interface or the Xn interface, the RRC Delivery Status Request message can be included for example in the RRC Transfer message.

Figure 4A:
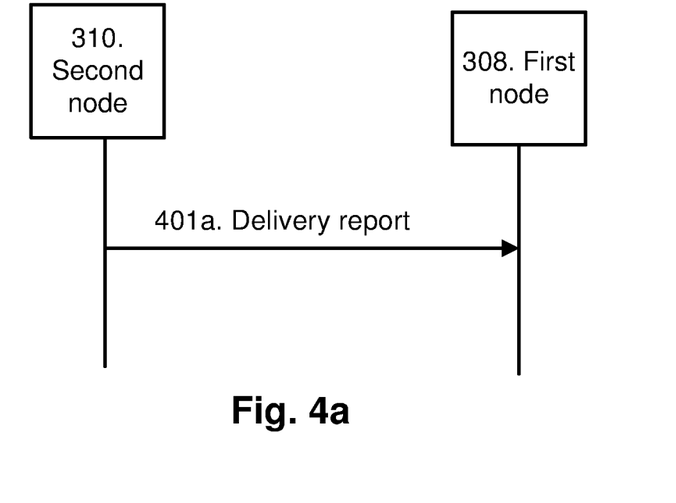
FIG. 4a is a flow chart illustrating embodiments of a method.

FIG. 4a shows an example where the second node 310 reports the delivery of one or more messages to the first node 308 by sending a delivery report 401a to the first node 308. The first node 308 receives the delivery report 401 from the second node 310.

Figure 4B:
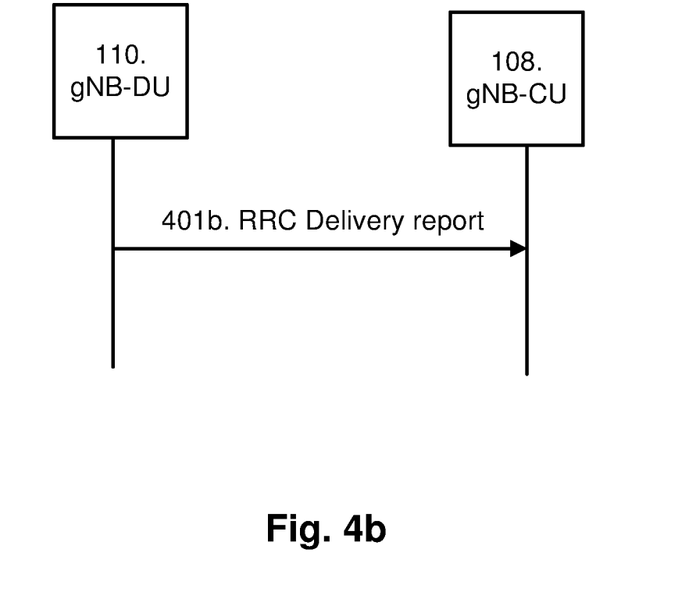
FIG. 4b is a flow chart illustrating embodiments of a method.

FIG. 4b illustrates an example where the first node 308 is a gNB-CU 108 and the second node 310 is a gNB-DU 110. To allow the gNB-DU 110 to report the delivery of one or more RRC messages and the PDCP SN, a new RRC Delivery Report procedure can be added as exemplified in FIG. 4b. The PDCP SN may be the highest PDCP SN. When the gNB-DU 110 has successfully delivered an RRC message to the UE 120 for which the gNB-CU 108 has requested a delivery report, the gNB-DU 110 shall send the RRC Container Delivery Report message 401b to the gNB-CU 108 comprising the RRC Delivery Status IE and the SRB ID IE. The gNB-CU 108 receives the RRC Container Delivery Report message 401b from the gNB-DU 110.

The content of the RRC Delivery message can be as exemplified in Table 2 below.

TABLE 2

RRC Delivery message

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | reject |
| RRC Delivery Status | M | | 9.3.1.Y | | YES | ignore |
| SRB ID | M | | 9.3.1.7 | | YES | ignore |

RRC Delivery Status

The RRC delivery status IE comprised in the RRC Delivery message seen in Table 2 above provides information about the delivery status of RRC messages to the UE 120, and is shown in Table 3 below.

TABLE 3

| IE/Group Name | Presence | Range | IE type and reference | Semantics description |
|---|---|---|---|---|
| Delivery Status | M | | INTEGER $(0 \ldots 2^{12}\text{-}1)$ | Highest NR PDCP SN successfully delivered in sequence to the UE 120. |
| Triggering Message | M | | INTEGER $(0 \ldots 2^{12}\text{-}1)$ | NR PDCP SN for the RRC message that triggered the report. |

The Triggering Message IE comprised in the RRC delivery status IE allows the gNB-CU 108 to identify the one or more RRC messages that have been RLC-Acknowledged, and that triggered the report. The Delivery Status IE comprised in the RRC Delivery status IE can be used to signal over X2/Xn for split SRBs, but also to detect eventual out-of-sequence delivery of RRC Messages to the UE 120. In some cases, this allows the gNB-CU 108 to know the actual configuration that the UE 120 has applied and act in case of potential misconfigurations.

Further, on X2 and Xn, the Delivery Status IE comprised the RRC transfer message, which caters for DL and UL RRC message delivery, Delivery Status report and NR UE measurement report in a single procedure, the Delivery Status IE provided to the sending RAN node that holds the RRC entity is defined as exemplified in Table 4.

Delivery Status

The Delivery Status IE comprised in the RRC Delivery message provides the delivery status of RRC PDUs provided by RRC Transfer message and is exemplified in Table 4 below.

TABLE 4

| IE/Group Name | Presence | Range | IE Type and Reference | Semantics Description |
|---|---|---|---|---|
| Delivery Status | M | | INTEGER $(0 \ldots 2^{12}\text{-}1)$ | Highest successfully delivered NR PDCP SN, as defined in TS 38.323. |

In addition to the Delivery Status IE, the RRC Delivery message may be enhanced by adding the Triggering Message IE, as proposed on F1AP.

The CU 308 on F1-C or the SN 310 on X2-C/Xn-C may provide a list of failed delivery RRC Messages by indicating the PDCP SN of the failed one or more messages to the node that sent the RRC message.

Figure 5:
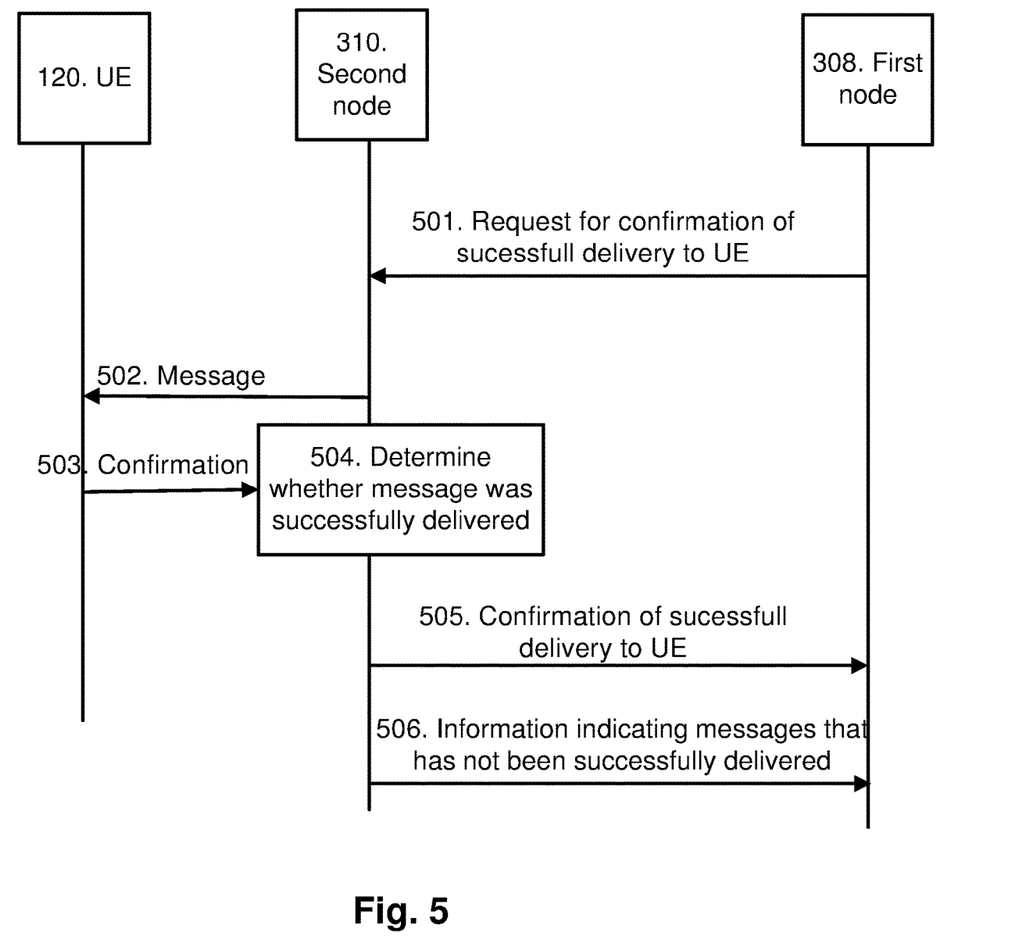
FIG. 5 is a signaling diagram illustrating embodiments of a method.

FIG. 5 is a signalling diagram illustrating an example of a method. The method comprises at least one of the following steps, which steps may be performed in any suitable order than described below:

Step 501

The first node 308 sends a request for confirmation of successful message delivery to the UE 120. The message may be an RRC message. The UE 120 receives the request from the first node 308.

Step 502

The second node 310 may or may not send the one or more messages to the UE 120. The message may be an RRC message. The UE 120 may or may not receive the message from the second node 310. The term "one or more" may refer to one, two, or any n number, where n is a positive integer larger than one.

Step 503

If the second node 310 sent the one or more messages to the UE 120 in step 502, the UE 120 may send a confirmation of received one or more messages to the second node 310. The second node 310 may receive the confirmation from the UE 120.

Step 504

The second node 310 determines whether the one or more messages were successfully delivered to the UE 120 or not. The one or more messages are determined to be successfully delivered when they have been sent and received by the UE 120. The one or more messages are determined to be not successfully, i.e. unsuccessfully, delivered when they have been sent, but not received by the UE 120 or when they have not been sent to the UE 120 at all. The second node 310 may determine successfully received messages by receiving the confirmation in step 503 or by detecting that the UE 120 acts according to instructions in the sent message. The second node 310 may determine that the one or more messages were not successfully received when the confirmation in step 503 has not been received before a timer has expired, it detects that the UE 120 is not behaving according to instructions sent in the one or more messages etc.

Step 505

If successful delivery was determined in step 504, then the second node 310 sends, to the first node 308, a confirmation of successful delivery of the one or more messages. The first node may receive the confirmation from the second node 310.

Step 506

If no successful delivery was determined in step 504, then the second node 301 sends, to the first node 308, information indicating that one or more message have not been successfully delivered by the second node 301 to the UE 120. The first node 308 receives the information from the second node 301.

Figure 6:
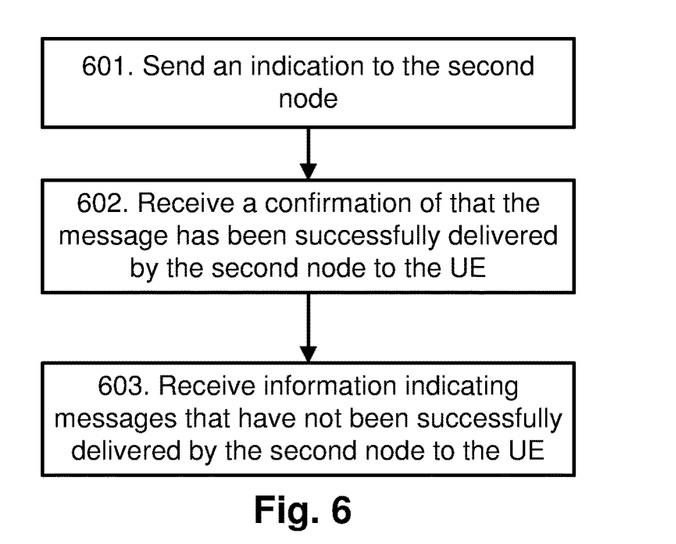
FIG. 6 is a flow chart illustrating a method performed by the first node.

The method described above will now be described seen from the perspective of the first node 108, 308. FIG. 6 is a flowchart describing the present method performed by the first node 108, 308 for handling message delivery to a UE 120.

The first node 108, 308 may be a CU or gNB-CU, and the second node 110, 310 may be a DU or gNB-DU. The first node 108, 308 may be a MN and the second node 110, 310 may be a SN when a communication system in which the first node 108, 308 and the second node 110, 310 are deployed applies dual connectivity.

The method comprises at least one of the following steps to be performed by the first node 108, 308, which steps may be performed in any suitable order than described below:

Step 601

This step corresponds to step 501 in FIG. 5. The first node 108, 308 sends an indication to the second node 110, 310. The indication indicates that the second node 110, 310 should inform the first node 108, 308 when one or more messages to the UE 120 have been successfully delivered by the second node 110, 310 to the UE 120.

The one or more messages may be RRC messages.

The indication may be sent over the F1 interface.

The indication may be sent over the X2/Xn interface.

The indication may be comprised in a RRC Delivery Request message.

Step 602

This step corresponds to step 401a in FIG. 4a, step 401b in FIG. 4b and step 505 in FIG. 5. The first node 108, 308 receives, from the second node 110, 310, a confirmation of that one or more messages have been successfully delivered by the second node 110, 310 to the UE 120.

The confirmation may comprise an identification of the one or more message successfully delivered to the UE 120.

The confirmation may comprise information indicating a transmitted sequence number that has been delivered in sequence to the UE 120. The transmitted sequence number may be a highest transmitted sequence number.

The confirmation may comprise information identifying the one or more messages that have been successfully delivered by the second node 110, 310 to the UE 120.

The confirmation may be received over the F1 interface.

The confirmation may be received over the X2/Xn interface.

The confirmation may be comprised in a RRC Delivery Report message.

Step 603

This step corresponds to step 401a in FIG. 4a, step 401b in FIG. 4b and step 506 in FIG. 5. The first node 108, 308 receives, from the second node 110, 310, information indicating one or more messages that have not been successfully delivered by the second node 110, 310 to the UE 120.

Figure 7:
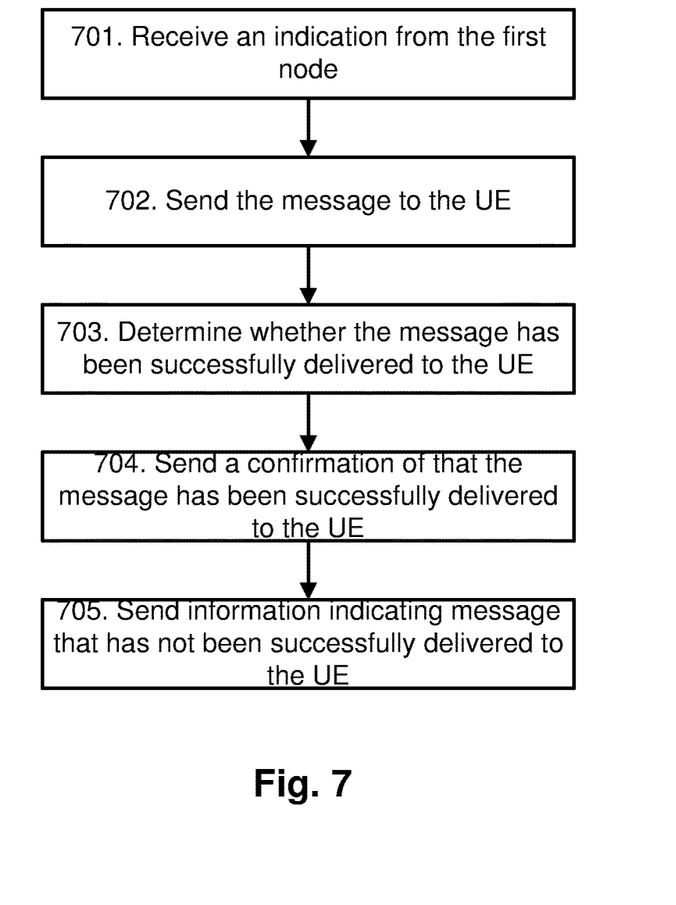
FIG. 7 is a flow chart illustrating a method performed by the second node.

The method described above will now be described seen from the perspective of the second node 110, 310. FIG. 7 is a flowchart describing the present method performed by the second node 110, 310 for handling message delivery to a UE 120. The first node 108, 308 may be a CU or gNB-CU, and the second node 110, 310 may be DU or gNB-DU. The first node 108, 308 may be a MN, and the second node 110, 310 may be a SN when a communication system in which the first node 108, 308 and the second node 110, 310 are deployed applies dual connectivity.

The method comprises at least one of the following steps to be performed by the second node 110, 310, which steps may be performed in any suitable order than described below:

Step 701

This step corresponds to step 501 in FIG. 5. The second node 110, 310 receives an indication from the first node 108, 308. The indication indicates that the second node 110, 310 should inform the first node 108, 308 when one or more messages to the UE 120 has been successfully delivered by the second node 110, 310 to the UE 120.

The one or more messages may be RRC messages.

The indication may be received over the F1 interface.

The indication may be received over the X2/Xn interface.

The indication may be comprised in a RRC Delivery Request message.

Step 702

This step corresponds to step 502 in FIG. 5. The second node 110, 310 may send the one or more messages to the UE 120.

A timer may be started when the one or more messages are sent to the UE 120.

Step 703

This step corresponds to step 503 in FIG. 5. The second node 110, 310 determines whether the one or more messages have been successfully delivered to the UE 120 or not.

The second node 110, 310 may determine that the one or more messages have been successfully delivered to the UE 120 by:

receiving a confirmation of the delivery from the UE 120, or by that the confirmation of the delivery from the UE 120 has been received before expiry of a timer.

The second node 110, 310 may determine that the one or more messages have not been successfully delivered to the UE 120 when:

no confirmation of the delivery has been received from the UE 120, or when no confirmation of the delivery has been received before expiry of a timer.

Step 704

This step corresponds to step 401a in FIG. 4a, step 401b in FIG. 4b and step 505 in FIG. 5. When the one or more messages have been successfully delivered to the UE 120, the second node 110, 310 sends, to the first node 108, 308, a confirmation of that the one or more messages have been successfully delivered to the UE 120.

The confirmation may comprise an identification of the one or more messages successfully delivered to the UE 120.

The confirmation may comprise information indicating a transmitted sequence number that has been delivered in sequence to the UE 120. The transmitted sequence number may be a highest transmitted sequence.

The confirmation may comprise information identifying the one or more messages that have been successfully delivered by the second node 110, 310 to the UE 120.

The confirmation may be sent over the F1 interface.

The confirmation may be sent over the X2/Xn interface.

The confirmation may be comprised in a RRC Delivery Report message.

A timer may be stopped when the confirmation is received.

Step 705

This step corresponds to step 401a in FIG. 4a, step 401b in FIG. 4b and step 505 in FIG. 5. When the one or more messages have not been successfully delivered to the UE 102, the second node 110, 310 may send, to the first node 108, 308, information indicating the one or more messages that has not been successfully delivered to the UE 120.

Figure 8:
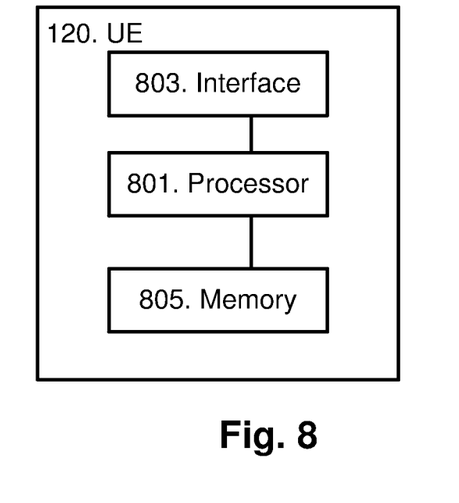
FIG. 8 is a schematic block diagram illustrating an example of a UE.

In FIG. 8, there is shown a UE 120. The UE 120 comprises a processor 801, an interface 803, and a memory 805, in which memory instructions are stored for carrying out the method steps explained above. The UE 120 communicates via the interface 803. The interface 804 comprises both an external interface, communicating with a transmitter and receiver, and internal interfaces (not shown).

Figure 9:
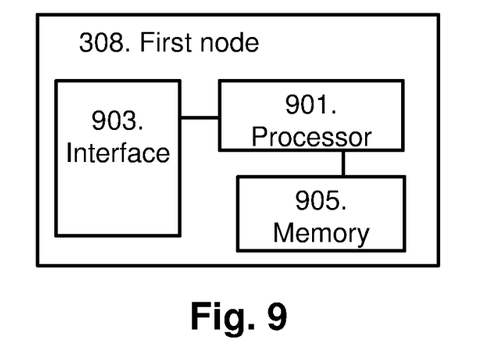
FIG. 9 is a schematic block diagram illustrating an example of a first node.

To perform the method steps shown in FIGS. 5 and 6 for handling message delivery to a UE 120, the first node 108, 308 may comprise an arrangement as shown in FIG. 9. In FIG. 9, there is shown a first node 108, 308 comprising a processor 901, an interface 903, and a memory 905. Instructions are stored in the memory for being performed by the processor such that the method steps explained above are carried out and signalling is communicated on the interface 803. The interface 903 comprises both an external interface, communicating with a transmitter and receiver, and internal interfaces (not shown).

The first node 108, 308 may be CU or gNB-CU and the second node 110, 310 may be a DU or gNB-DU. The first node 108, 308 may be a MN, and the second node 110, 310 may be a SN when a communication system in which the first node 108, 308 and the second node 110, 310 are deployed applies dual connectivity.

The first node 108, 308 is arranged to, e.g. by means of the interface 903, send an indication to the second node 110, 310. The indication indicates that the second node 110, 310 should inform the first node 108, 308 when one or more messages to the UE 120 have been successfully delivered by the second node 110, 310 to the UE 120. The one or more messages may be RRC messages. The indication may be sent over the F1 interface. The indication may be sent over the X2/Xn interface. The indication may be comprised in a RRC Delivery Request message.

The first node 108, 308 is arranged to, e.g. by means of the interface 903, receive, from the second node 110, 310, a confirmation of that the one or more messages have been successfully delivered by the second node 110, 310 to the UE 120. The confirmation may comprise an identification of the one or more messages successfully delivered to the UE 120. The confirmation may comprise information indicating a transmitted sequence number that has been delivered in sequence to the UE 120. The transmitted sequence number may be a highest transmitted sequence number. The confirmation may comprise information identifying the one or more messages that have been successfully delivered by the second node 110, 310 to the UE 120. The confirmation may be received over the F1 interface. The confirmation may be received over the X2/Xn interface. The confirmation may be comprised in a RRC Delivery Report message.

The first node 108, 308 is arranged to, e.g. by means of the interface 903, receive, from the second node 110, 310, information indicating one or more messages that have not been successfully delivered by the second node 110, 310 to the UE 120.

Figure 10:
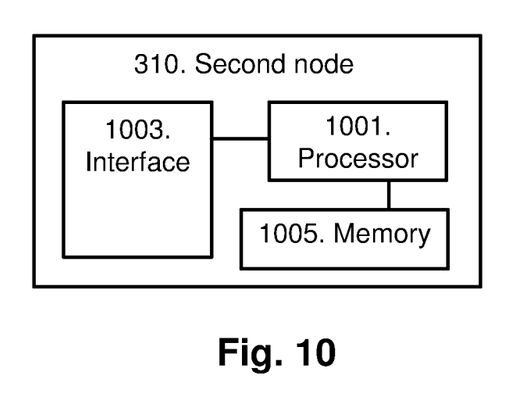
FIG. 10 is a schematic block diagram illustrating an example of a second node.

To perform the method steps shown in FIGS. 5 and 7 for handling message delivery to a UE 120, the second node 110, 310 may comprise an arrangement as shown in FIG. 10. In FIG. 10, there is shown a second node 110, 310 comprising a processor 1001, an interface 1003, and a memory 1005. Instructions are stored in the memory for being performed by the processor such that the method steps explained above are carried out and signalling is communicated on the interface 1003. The interface 1003 comprises both an external interface, communicating with a transmitter and receiver, and internal interfaces (not shown).

The first node 108, 308 may be CU or gNB-CU and the second node 110, 310 may be a DU or gNB-DU. The first node 108, 308 may be a MN, and the second node 110, 310 may be a SN when a communication system in which the first node 108, 308 and the second node 110, 310 are deployed applies dual connectivity.

The second node 110, 310 is arranged to, e.g. by means of the interface 1003, receive an indication from the first node 108, 308. The indication indicates that the second node 110, 310 should inform the first node 108, 308 when one or more messages to the UE 120 have been successfully delivered by the second node 110, 310 to the UE 120. The indication may be received over the F1 interface. The indication may be received over the X2/Xn interface. The indication may be comprised in a RRC Delivery Request message.

The second node 110, 310 is arranged to, e.g. by means of the processor 1001, determine whether the one or more messages have been successfully delivered to the UE 120.

The second node 110, 310 is arranged to, e.g. by means of the interface 1003, when the one or more messages have been successfully delivered, send, to the first node 108, 308, a confirmation of that the one or more messages have been successfully delivered to the UE 120. The confirmation may comprise an identification of the message successfully delivered to the UE 120. The confirmation may comprise information indicating a transmitted sequence number that has been delivered in sequence to the UE 120. The transmitted sequence number may be a highest transmitted sequence. The confirmation may comprise information identifying the one or more messages that have been successfully delivered by the second node 110, 310 to the UE 120. The confirmation may be sent over the F1 interface. The confirmation may be received and sent over the X2/Xn interface. The confirmation may be comprised in a RRC Delivery Report message.

The second node 110, 310 may be arranged to, e.g. by means of the interface 1003, sending the one or more message to the UE 120. The one or more messages may be RRC messages.

The second node 110, 310 may be arranged to, e.g. by means of the interface 1003, when the one or more messages have not been successfully delivered, send, to the first node 108, 308, information indicating the one or more messages that have not been successfully delivered to the UE 120.

The second node 110, 310 may be arranged to, e.g. by means of the processor 1001, determine that the one or more messages have been successfully delivered to the UE 120 by:
  receiving a confirmation of the delivery from the UE 120, or
  by that the confirmation of the delivery from the UE 120 has been received before expiry of a timer.

The second node 110, 310 may be arranged to, e.g. by means of the processor 1001, determine that the one or more messages have not been successfully delivered to the UE 120 when:
  no confirmation of the delivery has been received from the UE 120, or
  when no confirmation of the delivery has been received before expiry of a timer.

It is noted that the features of the methods described above and in the following, may be implemented in software and carried out on a data processing device or other processing means caused by the execution of program code means such as computer-executable instructions. Here and in the following, the term processing means comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof. For example, the program code means may be loaded in a memory, such as a RAM (Random Access Memory), from a storage medium, such as a read-only memory (ROM) or other non-volatile memory, such as flash memory, or from another device via a suitable data interface, the described features may be implemented by hardwired circuitry instead of software or in combination with software.

A computer program may comprise instructions which, when executed on at least one processor, cause the at least one processor to carry out the method steps 501-506, and/or method steps 601-603 and/or method steps 701-705. A carrier may comprise the computer program, and the carrier is one of an electronic signal, optical signal, radio signal or computer readable storage medium.

The above entities are adapted to communicate over known external telecom interfaces or via application programming interfaces (API), as appropriate.

A computer program or computer program product is provided carrying out the method steps defined above.

It should be noted that aspects of the embodiments herein may be utilized in connection with various services provided by a server or host computer to or from a user entity.

One intention of the CU-DU split of a NG-RAN node such as a gNB is for cloud implementation. The CU would then be in the cloud while the radio unit, e.g. DU, is located at the site.

With the embodiments herein, the NAS non-delivery requirement can be fulfilled. The indication of delivered RRC messages for split SRBs over X2/Xn can be fulfilled. The CU/MNM/SN can optimize RRM decisions through timely knowledge of the RRC messages that have been successfully delivered to the UE 120.

The embodiments herein are related to an access node, NG-RAN node, e.g. gNB, using split architecture and the standardized F1 interface. They are also related to CU and DU. First node 308 may correspond to a radio node, an access node, a control function, a control node, a radio control function etc. The second node 310 may correspond to a processing node, a radio node, a processing function, a radio processing function etc.

The embodiments herein relate to that successful delivery of RRC messages to the UE cannot be reliably detected nor correctly handled in a split architecture. The embodiments herein may relate to at least one of the following protocols: RRC, F1AP, NGAP, RLC, NAS.

In this disclosure, the term "wireless device" is sometimes used to represent any communication entity capable of radio communication with a wireless network by sending and receiving radio signals, such as e.g. mobile telephones, tablets, laptop computers and Machine-to-Machine, M2M, devices, also known as Machine Type Communication, MTC, devices. Another common generic term in this field is "User Equipment, UE" which is frequently used herein as a synonym for wireless device.

Further, the term "RAN node", is used herein to represent any node of a radio access network that is operative to communicate with wireless devices. The RAN node in this disclosure may refer to a base station, radio node, Node B, eNB, gNB, etc., although this disclosure is not limited to these examples. The term "eNB" is frequently used herein to represent a RAN node.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the above description.

The embodiments herein are not limited to the above described embodiments. Various alternatives, modifications and equivalents may be used. Therefore, the above embodiments should not be taken as limiting the scope of the embodiments. A feature from one embodiment may be combined with one or more features of any other embodiment.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear herein.

For example, a specification could plainly state that "at least one of A and B" should be understood to mean "only A, only B, or both A and B."

The invention claimed is:

1. A method performed by a first node for handling message delivery to a User Equipment, UE the method comprising:
   sending an indication to a second node, the indication indicating that the second node inform the first node when one or more messages have been successfully delivered by the second node to the UE;
   receiving, from the second node, a confirmation of that the one or more message have been successfully delivered by the second node to the UE, the confirmation comprising information indicating a transmitted sequence number that has been delivered in sequence to the UE, the confirmation indicating an out-of-order delivery event occurring when one or more messages have not been successfully delivered, the second node determining that the one or more messages have been successfully delivered to the UE by confirming the delivery from the UE has been received before expiry of a timer and the second node determining that the one or more messages have not been successfully delivered to the UE when no confirmation of the delivery has been received before expiry of the timer, the first node being a Master Node, MN, and the second node being a Secondary Node, SN, when a communication system in which the first node and the second node are deployed applies dual connectivity; and receiving, from the second node, information indicating one or more messages that have not been successfully delivered by the second node to the UE.

2. The method according to claim 1, wherein the confirmation comprises an identification of the one or more messages successfully delivered to the UE.

3. The method according to claim 1, wherein the one or more messages are Radio Resource Control, RRC, messages.

4. The method according to claim 1, wherein the indication and confirmation are sent and received over an X2/Xn interface.

5. The method according to claim 1, wherein the indication is comprised in a Radio Resource Control, RRC, Delivery Request message, and wherein the confirmation is comprised in a Radio Resource Control, RRC, Delivery Report message.

6. A method performed by a second node handling message delivery to a User Equipment, UE, the method comprising:

receiving an indication from a first node, the indication indicating that the second node inform the first node when one or more messages have been successfully delivered by the second node to the UE;

determining whether the one or more messages have been successfully delivered to the UE, the second node determining that the one or more messages have been successfully delivered to the UE by confirming the delivery from the UE has been received before expiry of a timer and the second node determining that the one or more messages have not been successfully delivered to the UE when no confirmation of the delivery has been received before expiry of the timer;

when the one or more messages have been successfully delivered, sending, to the first node, a confirmation of that the one or more messages have been successfully delivered to the UE, the confirmation comprising information indicating a transmitted sequence number that has been delivered in sequence to the UE, the confirmation indicating an out-of-order delivery event occurring when one or more messages have not been successfully delivered, the first node being a Master Node, MN, and the second node being a Secondary Node, SN, when a communication system in which the first node and the second node are deployed applies dual connectivity; and when the one or more messages have not been successfully delivered, sending, to the first node, information indicating the one or more messages that has not been successfully delivered to the UE.

7. The method according to claim 6, further comprising: sending the one or more messages to the UE.

8. The method according to claim 6, wherein the confirmation comprises an identification of the one or more messages successfully delivered to the UE.

9. The method according to claim 6, wherein the one or more messages are Radio Resource Control, RRC, messages.

10. The method according to claim 6, wherein the indication and confirmation are received and sent over an X2/Xn interface.

11. The method according to claim 6, wherein the indication is comprised in a Radio Resource Control, RRC, Delivery Request message; and wherein the confirmation is comprised in a RRC Delivery Report message.

12. A first node configured to:

send an indication to a second node, the indication being adapted to indicate that the second node inform the first node when one or more messages have been successfully delivered by the second node to the UE;

receive, from the second node, a confirmation that the one or more messages have been successfully delivered by the second node to the UE, the confirmation comprising information indicating a transmitted sequence number that has been delivered in sequence to the UE, the confirmation indicating an out-of-order delivery event occurring when one or more messages have not been successfully delivered, the second node determining that the one or more messages have been successfully delivered to the UE by confirming the delivery from the UE has been received before expiry of a timer and the second node determining that the one or more messages have not been successfully delivered to the UE when no confirmation of the delivery has been received before expiry of the timer; and receive, from the second node, information indicating one or more messages that have not been successfully delivered by the second node to the UE;

the first node being configured to be a Master Node, MN, and the second node being configured to be a Secondary Node, SN, when a communication system in which the first node and the second node are deployed is arranged to apply dual connectivity.

13. A second node configured to:

receive an indication from a first node, the indication being configured to indicate that the second node inform the first node when one or more message have been successfully delivered by the second node to the UE, the second node determining that the one or more messages have been successfully delivered to the UE by confirming the delivery from the UE has been received before expiry of a timer and the second node determining that the one or more messages have not been successfully delivered to the UE when no confirmation of the delivery has been received before expiry of the timer;

determine whether the one or more messages have been successfully delivered to the UE;

when the one or more messages have been successfully delivered, send, to the first node, a confirmation of that the one or more messages have been successfully delivered to the UE, the confirmation comprising information indicating a transmitted sequence number that has been delivered in sequence to the UE, the confirmation indicating an out-of-order delivery event occurring when one or more messages have not been successfully delivered; and when the one or more messages have not been successfully delivered, sending, to the first node, information indicating the one or more messages that has not been successfully delivered to the UE;

the first node being configured to be a Master Node, MN, and the second node being configured to be a Secondary Node, SN, when a communication system in which the first node and the second node are deployed is arranged to apply dual connectivity.

* * * * *